Jan. 26, 1960 A. H. ETT 2,922,893

DOCUMENT IDENTIFYING SYSTEM

Filed Oct. 15, 1954 2 Sheets-Sheet 1

INVENTOR.
ALLEN H. ETT

BY

Brown, Denk & Synnestvedt
AGENTS

INVENTOR.
ALLEN H. ETT
BY
Brown, Denk & Synnestvedt
AGENTS

United States Patent Office 2,922,893
Patented Jan. 26, 1960

2,922,893

DOCUMENT IDENTIFYING SYSTEM

Allen H. Ett, Philadelphia, Pa., assignor to Philco Corporation, Philadelphia, Pa., a corporation of Pennsylvania Application October 15, 1954, Serial No. 462,465

2 Claims. (Cl. 250—219)

The present invention relates to document identifying means and more particularly to means for producing distinctive electrical signals representing documents of known characteristics.

Banks, large department stores and other business establishments are faced with the problem of counting, sorting and maintaining an accurate record of many documents handled daily. The documents may be sales slips, shipping orders or United States or foreign currency accepted in payment for goods sold.

Sorting and counting these many documents by hand is a tiresome and time consuming process. This process relies on a visual examination of the document by a clerk and his mental interpretation of what he has seen.

Systems have been proposed for sorting such documents automatically. In general these systems rely on the registration of light and dark areas of the document (or the optical images of these areas) with an apertured mask or a bank of photocells. The chief disadvantage of such prior art systems is that the document must be immobilized in a prechosen position while the identification is being made. The mechanism required to transport the document to the place where the identification is to be made, immobilize the document, and then remove the document after the identification is complete, is complicated, expensive and extremely difficult to adjust for proper operation. Furthermore, some prior art systems rely on the edges of the document for their positioning information. If the identifying areas are not in proper register with the edges of the document, the prior art systems may give a false identification.

Therefore it is an object of the present invention to provide a document identifying system in which the document is identified while in motion through the system.

A further object of the present invention is to provide an electro-optical document identifying system which is not affected by certain variations in the position of the identifying areas on a document.

Still another object of the present invention is to provide an electro-optical document identifying system which does not require immobilization of the document for examination purposes.

These and other objects of the present invention are realized in a system which photoelectrically views areas of the document which are disposed in a fixed, known relationship to a reference mark appearing on the document. The documents are caused to pass through the viewing area on a suitable continuously moving conveyer. Means responsive to the above-mentioned reference mark cause the document within the viewing area to be illuminated for a very short time interval. The image of the illuminated document is caused to actuate a suitable photoelectric identifying system which provides an output signal which is representative of the type or class of the illuminated document.

For a better understanding of the present invention together with other and further objects thereof, reference should now be made to the following detailed description which is to be read in conjunction with the accompanying drawings in which:

Fig. 3 is a second schematic drawing illustrating the operation of a system for identifying shipping orders or the like.

Figure 1:
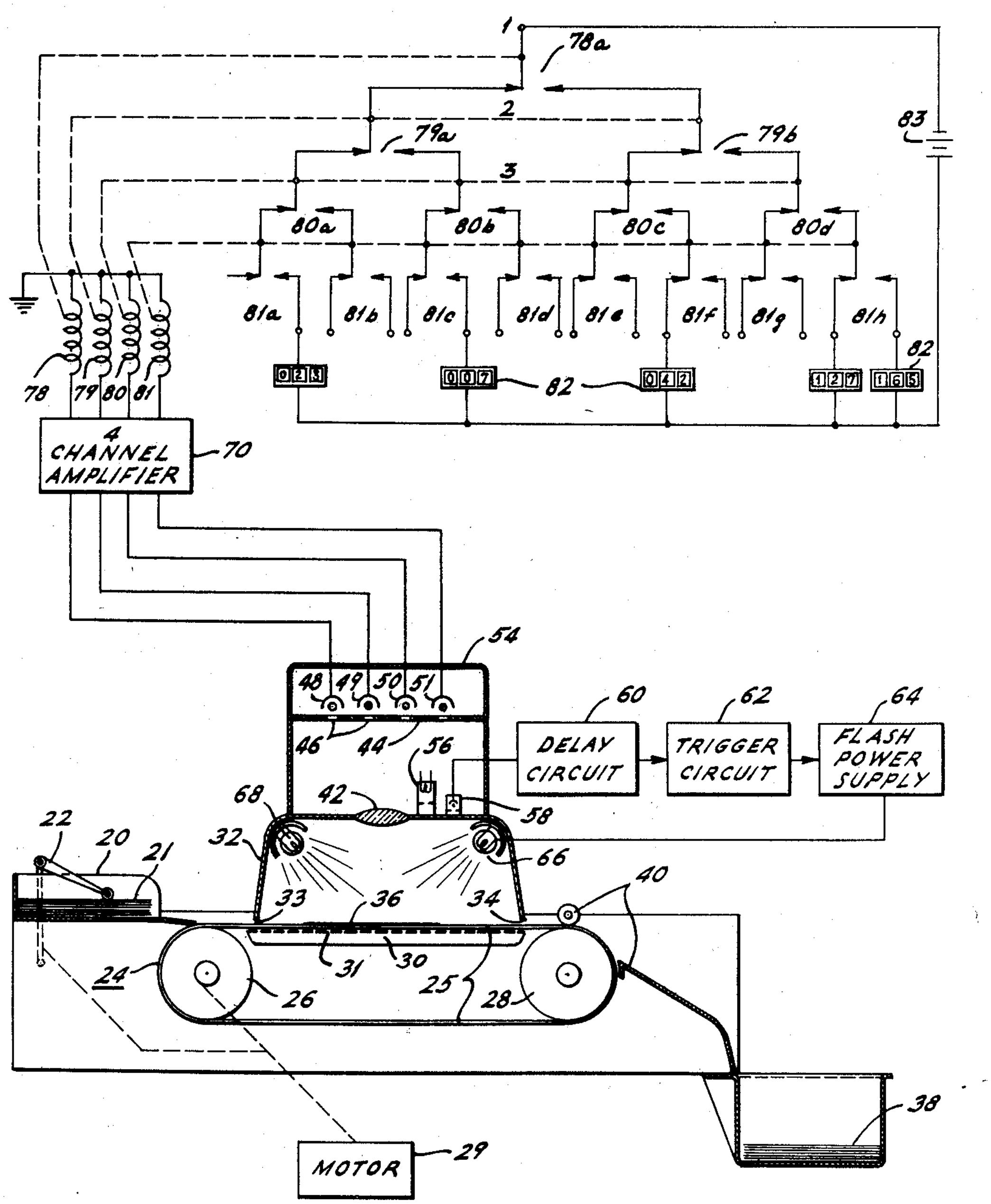
Fig. 1 is a schematic drawing partially in section of a preferred embodiment of the invention.

Turning now to Fig. 1, the embodiment of the invention there shown comprises a bin 20 into which documents 21, for example U.S. currency of various denominations, may be placed. Preferably bin 20 corresponds in width to the width of the documents so that the longitudinal axes of the documents all lie in a common vertical plane. An intermittent motion device 22 is provided for feeding the bills into position on a conveyer 24. Feeding device 22 may be of the type found on duplicating machines, printing machines or the like where it is necessary to feed one sheet of paper at a time. Feeding device 22 merely advances the documents to a position on the conveyer 24, one at a time, and without changing the direction of the longitudinal axis. It is not required to place the documents in any preselected position along the conveyer 24. Conveyer 24 comprises an endless belt 25 which is carried on rollers 26 and 28. Suitable driving means such as a motor 29 is mechanically coupled to roller 26 for driving the belt. This motor also controls feeding device 22. Guide means (not shown in Fig. 1) may be provided for insuring that the longitudinal axes of the documents are aligned with the direction of motion of the belt 25. Hold-down means, such as an evacuated chamber 30 having a perforated upper plate 31 disposed beneath belt 25, are provided to maintain the documents in position on belt 25. The documents fed from bin 20 to conveyer 24 are carried by belt 25 to a position within housing 32. Housing 32 forms a light shield over a portion of the moving belt 25. However, openings 33 and 34 are provided in the regions adjacent the belt to permit documents 21 to enter and leave housing 32. Document 36 is shown within housing 32 in the position in which the identification is made.

The embodiment of the invention shown in Fig. 1 is arranged to count but not sort documents of different types. Therefore a receiving bin 38 is provided adjacent the right hand end of the belt 25 for receiving the documents after they pass through housing 32. Stripping and guiding mechanism 40 is provided for removing documents from the moving belt and for depositing them in receiving bin 38.

Figure 2:
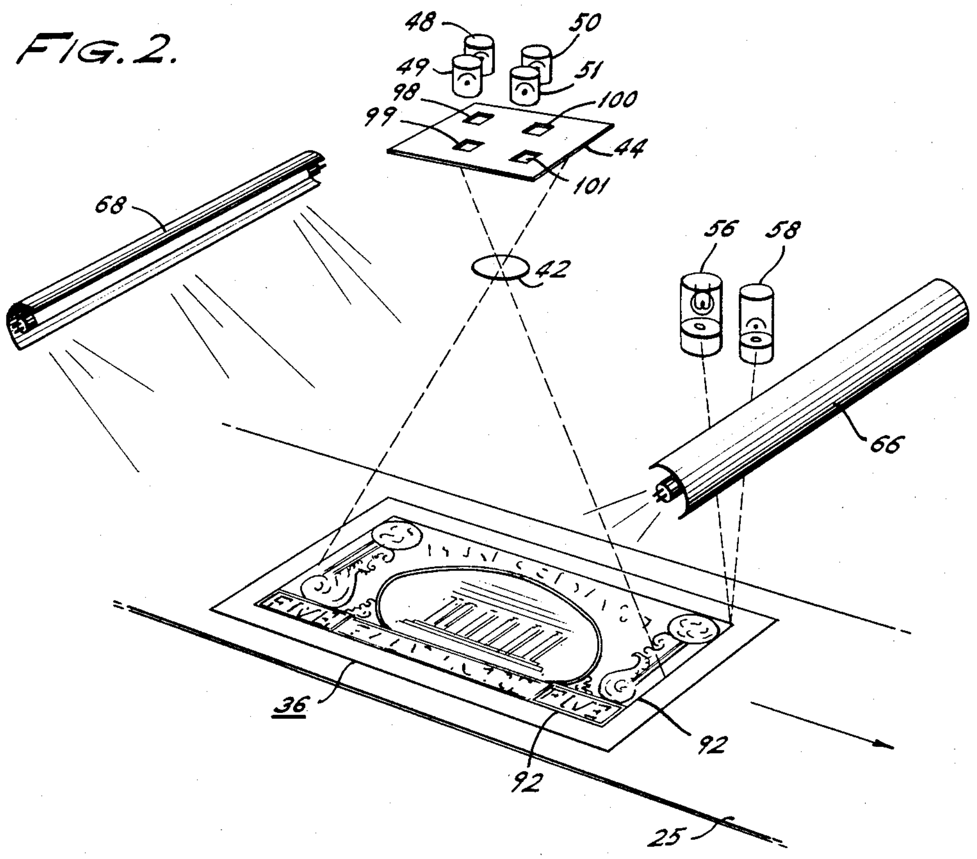
Fig. 2 is a schematic drawing illustrating the operation of a system for identifying United States currency.

A lens 42 is provided in the upper wall of housing 32. Lens 42 is arranged to project an image of document 36 on a mask 44 having openings 46 provided at selected locations therein. In Fig. 1 the openings 46 in mask 44 are shown as all lying in the plane of the section. However, as shown in Fig. 2, these openings may be positioned in any selected point on the area covered by the image projected on mask 44. Photocells 48, 49, 50 and 51 are disposed behind the openings 46 in mask 44. A housing 54 surrounds photocells 48 through 51 and mask 44 to prevent stray light from affecting the operation of the photocells.

A lamp 56 is positioned so as to project a spot or a line of light on a selected position on belt 25. A photocell 58 is arranged to view only the limited area illuminated by projection lamp 56. Photocell 58 is connected to the input of delay circuit 60 which is arranged to delay pulse type signals received from photocell 58 by a few microseconds or a few milliseconds depending upon the rate of travel of belt 25. The signal from delay circuit 60 is supplied to trigger circuit 62 which controls the operation of flash power supply 64. Trigger circuit 62 may be arranged to respond only to pulses of a preselected duration. Power supply 64 supplies energy to two flash lamps 66 and 68 which are positioned so as to illuminate the area of the belt 25 which is imaged on mask 44. Flash lamps 66 and 68 are preferably of the gaseous discharge type which provide a microsecond flash in response to trigger signals supplied by photocell 58. The circuits represented by blocks 60, 62 and 64 are in current use in photographic equipment and require no further description.

Photocells 48 through 51 are connected to individual inputs of a four channel amplifier 70. The outputs of these four channels control, respectively, relays 78, 79, 80 and 81. Relay 78 has one set of contacts 78$^{a}$ which form a single pole, double throw switch arrangement. Relay 79 is provided with two sets of contacts, 79$^{a}$ and 79$^{b}$, while relays 80 and 81 have four sets, 80$^{a}$–80$^{d}$ and eight sets 81$^{a}$–81$^{h}$, respectively. The relays are connected as shown in Fig. 1 to provide 16 possible combinations of relay positions each of which provides but a single closed path from the armature of relay 78 to one of the 16 contacts on relay 81. Electrically operated registers 82 are provided for all or a selected few of the contacts of relay 81. A power source such as battery 83 is connected between the armature of relay 78 and a common terminal of registers 82. Registers 82 are so constructed that they step by one number each time the circuit is closed to power supply 83. Registers of this type are available from a number of manufacturers.

In order to understand the operation of the system of Fig. 1 it will be helpful to consider for a moment the engraving employed on United States currency. Since 1934 the design appearing on the back of a bill of a given denomination is the same whether the bill happens to be a Silver Certificate, a Federal Reserve note or a United States note. This is true only of the design appearing on the back of the note, the design on the face of the note being varied to indicate the authority by which it is issued. The design appearing on the back of the U.S. currency varies considerably from denomination to denomination. This variation between denominations and the uniformity for any one denomination makes it possible to sort U.S. currency into denominations by electro-optical means. The differences in the face of the bills of any one denomination may be utilized to sort Silver Certificates, Federal Reserve notes and other currency.

It is well known that great care is taken in preparing the plates from which U.S. currency is printed. Therefore the design is always uniform on the bills. However, as will be seen from the examination of bills of any one denomination, the trimming of the bills is far from uniform. That is, the design is not always centered on the paper blank. This irregularity in the location of the design on the bill makes it impossible to use the edge of the paper as a reference line for controlling the identifying system. However, on bills of all denominations there is a fine green line which entirely surrounds the design and is accurately positioned with respect to the remainder of the design. It is this line that applicant proposes to use as a reference.

In Fig. 2, 36 is a schematic representation of a $5.00 bill placed face down on conveyor belt 25. Parts in Fig. 2 corresponding to similar parts of Fig. 1 have been given like reference numerals. As shown in Figs. 1 and 2, belt 25 carries bill 36 along until a point is reached where the light from lamp 56 strikes line 92 on bill 36. The dark color of this line causes a sharp decrease in intensity on the light arriving at photocell 58. This change in light intensity is converted into an electrical pulse which causes delay circuit 60, trigger circuit 62 and power supply 64 to energize discharge lamps 66 and 68 for a very short interval, for example a few microseconds. As mentioned above, trigger circuit 62 may include a pulse length discriminator circuit which permits trigger circuit 62 to respond only to discontinuities having a width equal to the width of line 92. The pulse length discriminator circuit prevents trigger circuit 62 from triggering power supply 64 when the edge of the bill 36 or some foreign object passes through the spot of light projected by lamp 56. The duration of the flash of light from lamps 66 and 68 is so selected that bill 36 moves through a distance which is small compared to the minimum detail that can be recognized by photocells 48 through 51. The image of the momentarily illuminated bill is focused on mask 44 by lens 42. As shown in Fig. 2 mask 44 has openings 98 through 101 formed therein. These openings may be transparent openings in an otherwise opaque mask or they may be black and white negatives of certain selected areas on the bill, that is, mask 44 may be generally opaque whereas each of the openings 98 through 101 has opaque and transparent areas corresponding to light and dark lines within each selected area. The position of the areas 98 through 101 on mask 44 must be chosen with due regard to the document to be identified. In the case of U.S. currency they are so selected that the combination of light and dark areas focused on this mask for bills of various denominations will be different for each denomination to be identified. For example, aperture 98 may correspond to the area lying somewhere in the relatively clear field to the left of the oval on a $5.00 bill, aperture 100 at a point in the field directly below the M in AMERICA, aperture 99 to a point on the vertical center line of the Lincoln Memorial and approximately half way up the column and aperture 51 to a position in the scroll work immediately above the V in the word FIVE in the lower right hand corner. Under these conditions an image of a $5.00 bill focused on mask 44 would superimpose light areas on apertures 98 and 100 and dark areas on apertures 99 and 101. The light areas on apertures 98 and 100 would cause relays 78 and 80 to be energized, thus completing a circuit to the left hand contact of the contact pair **81*f* of Fig. 1. This would cause the counter associated with this contact to register an increase of one number. Suppose that the next bill in line happens to be a $1.00 bill. The apertures in mask 44 will correspond to the following regions on a $1.00 bill. Aperture 98 will now correspond to an area lying somewhere in the circle at the left of the $1.00 bill, aperture 99 to the clear area between the left leg and the diagonal of the letter N which is centered on the back of the bill. Aperture 100 will correspond to an area lying in the scroll design above and to the right of the E, and aperture 101 will correspond to a clear area in the numeral 1 appearing at the lower right hand corner of the bill. This clear area is the one that appears above the word ONE which overlies the numeral 1. An image of the $1.00 bill focused on mask 44 will thus cause dark areas to be imaged on apertures 98 and 100 and light areas to be imaged on apertures 99 and 101. This will cause voltage to be supplied to the right hand contact of pair 81*c*. The counter associated with this contact will indicate that a $1.00 bill has passed through the counting device. Ten and twenty dollar bills will cause other different combinations of light and dark areas to be imaged on mask 44** and cause different counters to be actuated.

It was mentioned earlier that, for proper operation of the system, the currency must be stacked with a particular orientation in bin 20. However, the system can be arranged to accept documents in any orientation. One possible way of accomplishing this result with United States currency is to select the positions of the apertures in the mask so that the same combination of light and dark areas is imaged on the apertures for any of the four possible orientations of a bill of a given denomination. However, if a large number of denominations are to be counted, the selection of the appropriate areas becomes very difficult and more than four apertures may be needed for proper identification. A second solution is to provide sufficient combinations so that there are four combinations, one for each possible orientation, available for each denomination. The four combinations may operate a single register or they may operate separate registers.

An embodiment of the invention which recognizes only one orientation of each denomination can also be used to count non-oriented bills provided that the apertures are so selected that a misoriented bill of one denomination will not register as a bill of another denomination. This is done by running the stack of bills through the system four times, each time changing the orientation of the stack without changing the relative orientation of the bills within the stack. The time required for this last described system to count a stack of bills can be reduced if sorting means are added at the output which separates the counted bills from the misoriented bills. The sorting means may be made responsive to all combinations of light and dark areas which do not identify bills of desired denominations. For example, suppose a system is arranged to count bills of five different denominations. Suppose further that means are provided for diverting improperly oriented bills from receiving bin 38 to a similar bin. In such an arrangement properly oriented bills of the five different denominations would pass through the system and would be counted and deposited in bin 38. Bills not corresponding to these five denominations either because of their orientation or because they are of a different denomination or counterfeit would be deposited in a separate bin. The bills in this separate bin would then be replaced in bin 20 with their orientation reversed. In this position one or more bills in the replaced stack may have the proper orientation to be counted by the system. These bills will be deposited in bin 38. The bills still not corresponding to any of the selected relay combinations will again be deposited in the auxiliary bin. The step of replacing the bills in bin 20 and again running them through the sorting and counting system may be repeated for the other two possible orientations of the bills. After four trips through the identifying system the bills appearing in the reject bin will be only those bills not corresponding to the denominations to be counted. The addition of the sorting device not only reduces the total number of bills passing through the system since properly oriented bills are not recirculated, but it also causes all of the bills to be placed in proper orientation in the final stack. Sorting machines for directing documents into one channel or another in response to a control signal are well known in the paper handling art and their addition to a system of the type shown in Fig. 1 may be accomplished without invention. As mentioned earlier, the number of passages of the bills through the system may be reduced by so selecting the identifying areas on the bill that two or more different indications are provided for each denomination. One combination will identify a bill when the back of the bill is up with the right hand of the design leading as the bill passes along belt 25. A second combination will identify the bill with the back up but with the left hand edge of the design leading. The system will then identify all bills of the selected denominations which were oriented with their backs up. If the rejected bills are inverted and passed through the system, the system will then count all the remaining bills of the selected denominations. It is obvious that areas employed for identification must be chosen with care so that a design appearing on the face of one bill does not throw the same combination of light and dark areas on mask 44 as a combination that identifies a bill of a different denomination.

It should also be clear from the foregoing discussion that means may be added for sorting the bills according to denominations. This involves merely the addition of appropriate sorting devices which respond to the same combination of relay energizations as the counters of Fig. 1.

Figure 3:
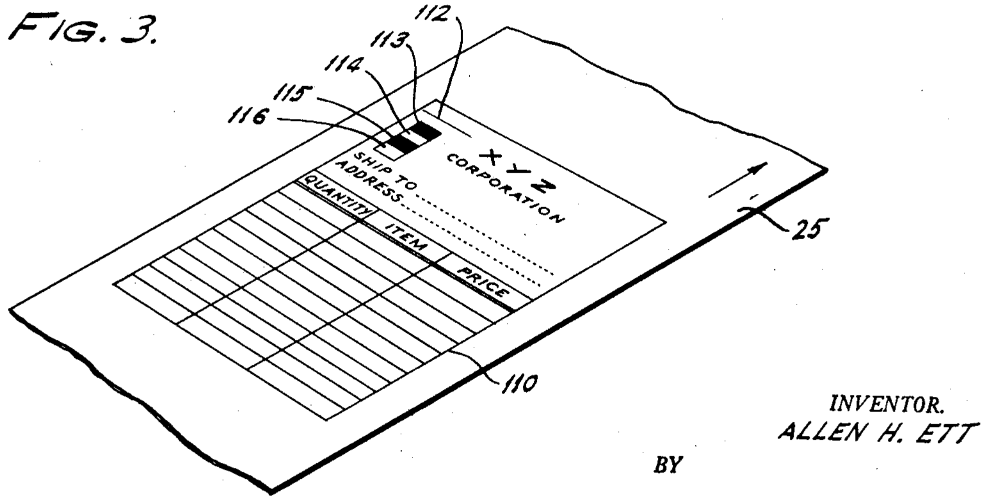

Fig. 3 illustrates a document 110 such as a shipping order which has an identifying code imprinted on the upper left hand corner of the document. This code consists of a reference line 112 corresponding to the green line on the U.S. currency. Immediately below line 112 are four squares 113 through 116 which are employed in the identifying process. The code shown in Fig. 3 in which squares 113 and 115 are dark and squares 114 and 116 are light represents but one of 16 possible combinations of the four squares. The coding may be placed on the document 10 by printing, stamping or any other suitable method. Alternatively, line 112 and the outline of squares 113 to 116 may be printed on the document and the appropriate squares blacked in by the shipping clerk. The code may represent the amount of the transaction involved, the destination to which the material mentioned on the document is to be shipped or the number and nature of the items listed on the slip. Several columns of squares may be employed for providing more than one item of information. Each column will control a separate bank of relays. Relays 78 through 81 may control either counting or sorting circuits or a combination of counting or sorting circuits.

As the foregoing discussion indicates, the documents identified by the system disclosed herein move continuously through the system on conveyer belt 25. The images of these documents are effectively immobilized by the short duration flashes supplied by lamps 66 and 68. The image focused on mask 44 is identified by photocells 48 through 51. These photocells control relays 78 through 81. The contacts on these relays in turn, control appropriate means for sorting and counting the documents.

If the documents to be identified are transparent with opaque markings or opaque with transparent markings, for example punched cards, the photocells may be placed on the opposite side of the document from the source of illumination. A lens system may be employed to project the transmitted image of the document on a mask or the mask may be located directly beneath the path travelled by the documents.

While I have described what at present are considered to be the preferred embodiments of the present invention, it will be recognized that various changes and modifications may be made therein without departing from the spirit and scope of the hereinafter appended claims.

Having now described my invention I claim:

1. A system for identifying currency having a design on at least one face thereof and a separate fine line at least partially surrounding said design, said system comprising a conveyer for transporting paper money, means for sequentially placing individual units of said paper money on said conveyer, a photoelectric means for providing a distinctive signal in response to the passage of the said line surrounding the design on the exposed face of said units through a preselected reference position along the path of said conveyer, means responsive to said distinctive signal provided by said photoelectric means for momentarily illuminating the unit which caused the generation of said distinctive signal, a mask, a lens system disposed between said mask and said unit of paper money for imaging on said mask said illuminated unit of paper money, said mask being formed with apertures therein at points corresponding to selected regions on said units of paper money, said regions being so selected that the relative reflectivities of the several regions are indicative of a selected characteristic of each of said units, and a plurality of separate means each responsive to the energy passing through a corresponding one of said apertures for generating a plurality of signals, a selected characteristic of each signal being indicative of the reflectivity of the region imaged on a corresponding aperture during said momentary illumination of said unit of paper money.

2. A system for identifying separate documents which have marked thereon a reference line having a reflectivity substantially different from that of the immediately adjacent portion of said document and a plurality of regions located at known positions with respect to said reference line, said system comprising a conveyor for transporting said documents, means for sequentially placing said documents to be identified on said conveyer with said reference line transverse to the direction of transport of said documents, photoelectric means for providing a distinctive signal in response to the passage of said reference line through a preselected reference position along the path of said conveyer, means responsive to the signal provided by said photoelectric means for momentarily illuminating the document which caused the said signal to be generated, a mask, a lens system disposed between said mask and said document for imaging on said mask said illuminated document, said mask being formed with apertures therein at regions coincident with points on said image corresponding to selected ones of said regions of said document, separate means associated with each aperture for generating a signal indicative of the reflectivity of the region imaged on that aperture during said momentary illumination of said document, and means responsive to the signals generated by said last-mentioned means for providing a signal which uniquely represents which of said apertures have imaged thereon a region of preselected reflectivity.

References Cited in the file of this patent

UNITED STATES PATENTS

| | | |
|---|---|---|
| 2,224,646 | Friedman et al. | Dec. 10, 1940 |
| 2,358,051 | Broido | Sept. 12, 1944 |
| 2,438,588 | Tolson | Mar. 30, 1948 |
| 2,573,405 | Clark | Oct. 30, 1951 |